Oct. 22, 1963 C. R. HURTIG 3,108,230

CRYSTAL DISCRIMINATOR CIRCUITS

Filed Dec. 6, 1960 3 Sheets-Sheet 1

INVENTOR
CARL ROBERT HURTIG
BY Rines and Rines
ATTORNEYS

INVENTOR
CARL ROBERT HURTIG

BY

Rines and Rines

ATTORNEYS

CRYSTAL DISCRIMINATOR CIRCUITS

Filed Dec. 6, 1960 3 Sheets-Sheet 3

INVENTOR
CARL ROBERT HURTIG

BY Rines and Rines

ATTORNEYS

United States Patent Office 3,108,230

Patented Oct. 22, 1963

3,108,230

CRYSTAL DISCRIMINATOR CIRCUITS

Carl Robert Hurtig, Greenbush, Mass., assignor, by mesne assignments, to Pacific Industries, Inc., a corporation of California Filed Dec. 6, 1960, Ser. No. 74,158

6 Claims. (Cl. 329—117)

The present invention relates to discriminator circuits and, more particularly, to electric discriminator networks adapted for the detection of frequency-modulated signals and the like.

The art is replete with numerous types and configurations of discriminator networks for use in detecting frequency-modulated signals and the like. In some instances, the employment of piezoelectric crystals as frequency-sensitive impedance elements in the discriminator network has been preferred, as described, for example, in United States Letters Patent 2,913,580, issued November 17, 1959, to David I. Kosowsky. Discriminator networks of this character and of the various other prior-art types have been particularly designed for utilization with current sources, such as pentode or other electron-tube amplifiers and the like, and have generally fed relatively high-impedance circuits such as the input circuit of a pentode. As an illustration, in the said Letters Patent, a crystal discriminator network is disclosed that is particularly adapted to be energized from a current source, and that, in turn, may feed an input circuit of an electron amplifier output stage. This discriminator, much as other prior-art discriminators, involves the employment of a piezoelectric crystal, in series circuit with another impedance arm, connected across the current input source, each of the series arms being shunted by an appropriate detector or similar circuit for producing a direct-current voltage corresponding to differences in current passing through the two series arms of the discriminator network Unfortunately, such prior-art circuits are not suited to the problem of operation either with substantially constant-output voltage sources or with ultimate loads of very low impedance, such as would be involved in the case of operation with transistor relays or the like. It is to the solution of the problem of providing satisfactory discriminator networks that can operate under these conditions, that the present invention is primarily directed.

An object of the present invention, accordingly, is to provide a new and improved discriminator circuit that is particularly adapted for operation with a substantially constant-output source of frequency-modulated signal voltage or the like, and that, in turn, ultimately may feed a load having an impedance of value low compared with the output impedance of the discriminator-detecting means.

In summary, this end may be attained through the utilization of a discriminator network comprising a pair of parallel-connected arms, each arm having an input and output terminal, and one arm containing preferably the piezoelectric means, having effective shunt and series-resonance frequencies on opposite sides of the center frequency of the frequency-modulated signal or the like. The other arm contains an impedance of value sufficient to produce a zero crossing of discriminator response, intermediate the said shunt and series resonance frequencies. The network input terminal is connected to one side of the source, and detecting means is connected with the arms for producing at the said output terminal a direct-current, representative of the difference between the magnitudes of the signal current in each of the arms. A load of impedance value that may be low compared with the output impedance of the detecting means, may then be connected between the said output terminal and the other side of the source.

A further object of the present invention is to provide a new and improved discriminator circuit, of more general utility, also.

Still an additional object of the invention is to provide a new and improved crystal discriminator network.

Other and further objects will be explained hereinafter and will be more particularly pointed out in connection with the appended claims.

The invention will now be described in connection with the accompanying drawing, FIG. 1 of which is a circuit diagram illustrating, in generalized block-diagram form, the principles of the present invention;

Figure 1:
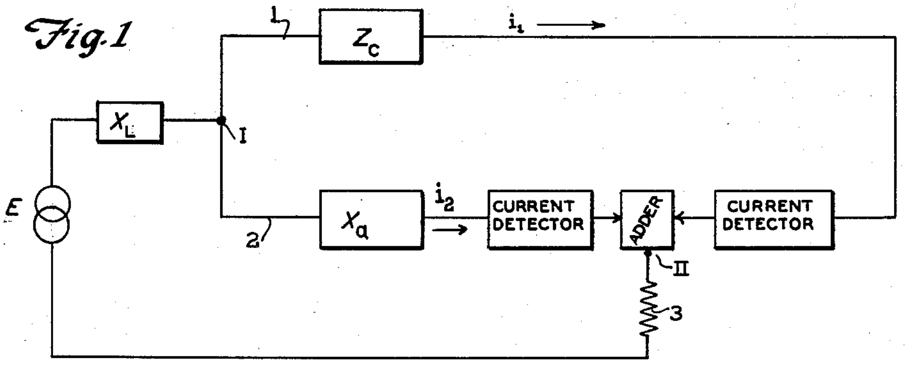

Referring to FIG. 1, a voltage source of substantially constant output, such as a transistor amplifier stage or the like of low internal impedance compared with that of the rest of the circuit, is schematically illustrated at E, for providing the signal voltage, such as the frequency-modulated or phase-modulated signal and the like, of predetermined center frequency. The upper terminal of the constant-output voltage source E is shown connected to an impedance element $X_L$, the purpose and details of which are hereinafter described, and is then connected to an input terminal I of a discriminator network embodying two parallel branches or arms 1 and 2.

The upper parallel branch or arm 1 is shown containing an impedance element, generalized by the notation $Z_C$, of the type that has both shunt- and series-resonance frequencies, with these frequencies disposed on opposite sides of the said center frequency. Suitable impedance elements $Z_C$ include a piezoelectric crystal or piezoelectric crystal circuit, or equivalent lumped parameters and the like. The current flowing in the upper branch or arm 1 is designated by the symbol $i_1$. In the lower branch or arm 2, a further impedance element is schematically represented by the symbol $X_a$, the lower branch passing a current $i_2$.

The upper-arm current $i_1$ is shown feeding a right-hand current detector, so labelled, and the lower-arm current $i_2$ is similarly shown feeding a left-hand oppositely poled current detector. The detected currents are algebraically added in an adder circuit to produce at the output terminal II, a direct current that is representative of the difference between the magnitudes of the alternating signal currents $i_1$ and $i_2$ in each of the respective arms 1 and 2. An output load, indicated at 3, such as a further transistor stage of impedance value that may be low compared to the output impedance of the detector circuit, is connected from the discriminator network output terminal II to the lower terminal of the voltage source E.

Figure 2:
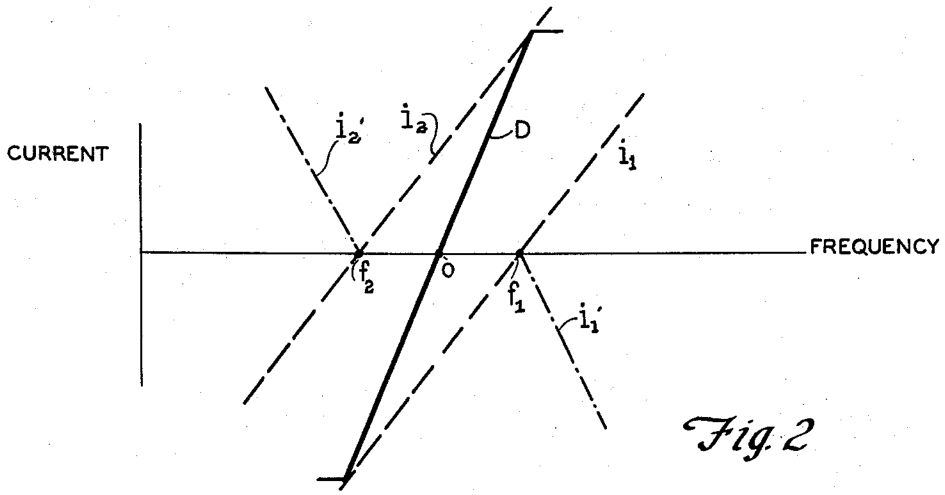
FIG. 2 is an explanatory graph of the operation of the system of FIG. 1.

It has been found that proper adjustments of the values $X_a$ and $X_L$, for a predetermined $Z_C$, will produce discrimination results entirely suited to the purposes of the constant-output voltage source E and the driving of a low-impedance output load 3 without appreciably influencing the discriminator characteristic of output current as a function of frequency deviation over a relatively wide frequency range. The input impedance of the discriminator 1, 2, will be a high impedance, within the discriminator region, the source E having a relatively low internal impedance considerably less than that of the discriminator circuit. The input impedance of the discriminator 1, 2, will go through a very large value (theoretically infinite) at the center frequency of the discriminator, and the impedance will decrease to lower values on either side of the center frequency, but will maintain a high value throughout the range of primary interest. The operation graphically represented in FIG. 2, indeed, may be thereby attained; FIG. 2 plotting output current along the ordinate and frequency along the abscissa. If $f_1$ and $f_2$ represent, respectively, the shunt and series-resonant frequencies of the piezoelectric crystal or other circuit $Z_C$, then, it has been found that, through appropriate selection of the impedance $X_L$, the currents $i_1$ and $i_2$, passing respectively through the parallel upper and lower arms 1 and 2 of the discriminator network, will vary substantially linearly, as shown by the respective dashed-line curves $i_1$ and $i_2$ passing through the respective points $f_1$ and $f_2$. By appropriate opposite-polarity detection, as before described, the negative or lower portion of the $i_2$ curve below the abscissa may be inverted, as shown by the dash-dot curve $i_2'$; and the positive or upper portion above the abscissa of the curve $i_1$ may be inverted, as shown by the dash-dot curve $i_1'$. This flattens the discriminator response outside of the frequency band between $f_1$ and $f_2$. Through proper value of the impedance $X_a$, a zero crossing, indicated at O, may be provided in the utimate resulting discriminator response, shown in the solid-line resultant curve D; the zero crossing lying between the series and shunt resonance points $f_1$ and $f_2$ of the piezoelectric crystal or other similar circuit $Z_C$.

Figure 3:
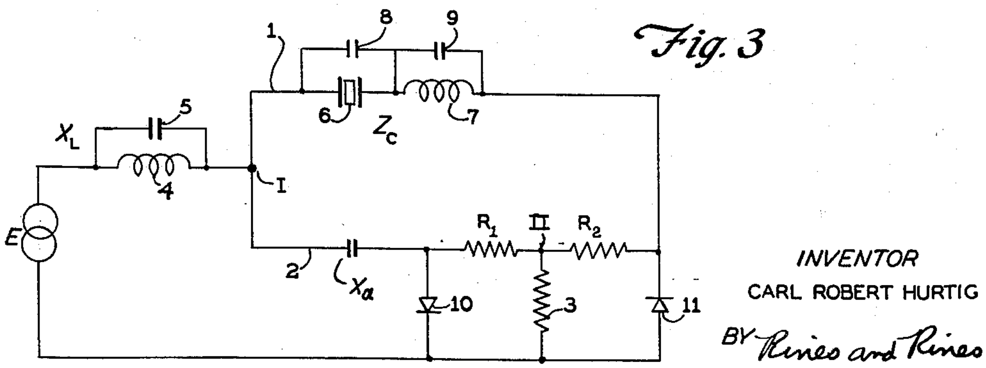
FIG. 3 is a circuit diagram of a preferred embodiment of the invention, including a piezoelectric crystal in the discriminator circuit.

A practical circuit for achieving this result is shown in FIG. 3, wherein the impedance $X_L$ comprises an inductance 4 shunted by a capacitance 5, with the combination 4—5 having a particular impedance value at the center frequency, later described. The piezoelectric crystal circuit is shown at $Z_C$ assuming the form of a two-electrode piezoelectric crystal resonator 6 connected in series with an inductance 7, and with each of the elements 6 and 7 in turn shunted by respective capacitors 8 and 9. The use of capacitance in parallel with the piezoelectric resonator, as is well-known, lowers the frequency of the pole or anti-resonance of the crystal, thus decreasing the spacing between the pole and zero, if desired. The frequency spacing between the pole and zero may also be decreased by the use of a capacitor in series with the piezoelectric crystal resonator, to raise the frequency to the zero point. One may, however, as is also well-known, increase the frequency spacing between the pole and zero, by the use of an inductor, such as 7, in series with the resonator, thereby increasing the frequency between series resonance and anti-resonant points. As later discussed in connection with the embodiments of FIGS. 4 and 7, moreover, the frequency spacing from zero may be increased, if desired, by the use of an inductor in parallel with the piezoelectric resonator, thereby to raise the frequency of the pole or anti-resonance point. In these last two cases, moreover, the number of critical frequencies is, of course, increased; the use of the series inductance, such as the inductor 7 of FIG. 3, for example, producing a combination containing two zeros and one pole, and the use of a parallel inductance, as in FIGS. 4 and 5, producing a combination that contains two poles and one zero. As explained in the said Letters Patent, moreover, the inductance used with the resonator may imbue the circuit with the unique property of permitting both the control of the pole-zero spacing, and the ability to transform the entire impedance.

The selection of an appropriate impedance $X_a$ in FIG. 3, shown as preferably comprising a capacitive impedance for this circuit arrangement, of valve made preferably substantially equal or close to the static or shunt capacitance of impedance $Z_c$ (where the term "shunt capacitance" is intended to connote the capacitance presented not only by the crystal and its electrodes and holder, but the associated impedance elements connected therewith, as well), has been found to insure the positioning of the zero crossing O between the critical frequencies $f_1$ and $f_2$. The particular current detectors illustrated in FIG. 3, are represented by the oppositely-poled diodes 11 and 10; such as crystal rectifiers or the like, the upper terminals of which are respectively connected to the impedance elements $Z_c$ and $X_a$ of the upper and lower parallel arms 1 and 2 of the discriminator network. The diode upper terminals connect, also, through resistance elements $R_1$ and $R_2$ to the output terminal II of the parallel-arm discriminator network. The lower oppositely-poled terminals of the rectifiers 10 and 11 are shown connected to the lower terminal of the source E, and the low-impedance output load 3 is connected between the output terminal II and the lower terminal of the source E.

As an illustration, the output current load 3 may vary from substantially a short circuit to a resistance of finite value, with typical value being in the range, for example, of from substantially zero ohms, to several thousand ohms. In general, the output current versus frequencies characteristic is only slightly affected by the value of the load resistance 3, so long as that resistance is small compared with the values of the adding resistors $R_1$ and $R_2$. At ten-megacycles frequency, the value of the capacitor $X_a$, FIG. 3, may be in the range of from about 5 to 30 micromicrofarads, corresponding to a similar-valued shunt capacitance of the crystal system $Z_C$.

In order to produce a substantially linear output as a function of the frequency deviation from the center frequency of the discriminator, that may drive the very low impedance load 3 without appreciably influencing the characteristic of the current output-versus-frequency deviation, the impedance $X_L$, represented by the inductance 4 and shunt capacitance 5, may be adjusted to insure appropriate linear shaping of the current in the two arms 1 and 2, as represented by the curves $i_1$ and $i_2$ of FIG. 2. To obtain appropriate shaping, it has been found that the net inductive reactance $X_L$ at the center frequency should be substantially half the reactance of the above-discussed impedance $X_a$. Under these circumstances, the desirable linear resultant response D of FIG. 2 will be produced with the other advantageous features before referred to in connection with operation with a constant-output voltage source E of low internal impedance, and driving of the low-impedance output load 3.

Figure 4:
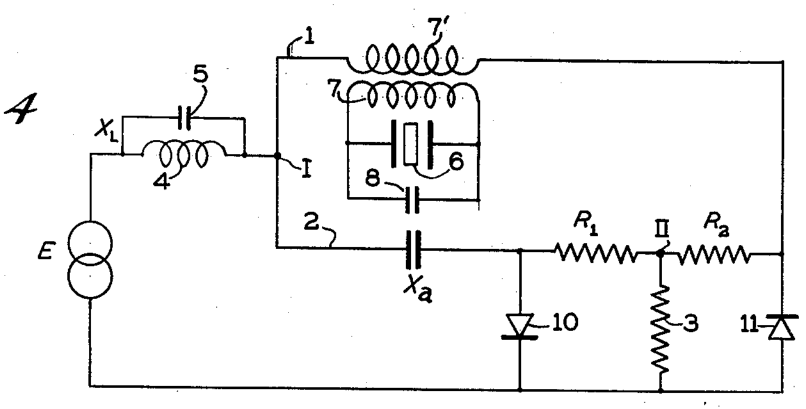
FIG. 4 is a similar circuit diagram of a modification embodying transformer coupling to the piezoelectric crystal.
Figure 5:
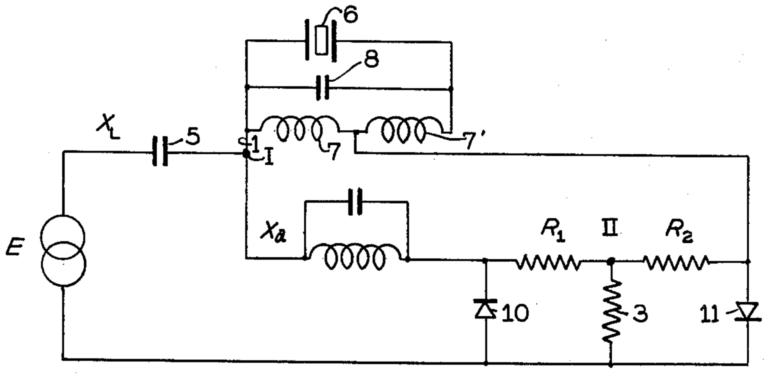
FIG. 5 is a circuit diagram of still a further modification.

In the modification of FIG. 4, the crystal 6 is effectively provided with a shunt inductance 7, serving as a winding of a transformer, the other cooperative winding 7' of which is directly connected in the upper arm 1. In the modification of FIG. 5, on the other hand, in order to illustrate the versatility of the invention, the impedance $X_L$ is shown primarily capacitive at 5, and the piezoelectric crystal 6 is shown shunted by inductance elements 7 and 7' with the arm 1 connected to the detector 11 from a mid-point connection between the inductors 7 and 7'. The impedance $X_a$ is shown comprising a parallel-connected coil and capacitor, and the rectifiers 10 and 11 are shown in reverse polarity to that illustrated in FIGS. 3 and 4, thereby changing the slope of the discriminator characteristic from one direction to the other.

Figure 7:
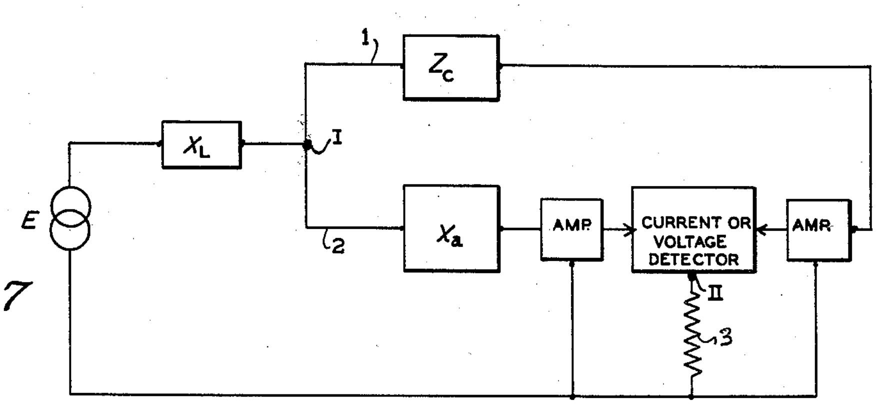
FIG. 7 is a circuit diagram, illustrated in block diagrammatic generalized form, embodying a modified type of detecting circuit.

Alternately, as shown in the system of FIG. 7, the detectors 10, 11, may be replaced by a combination of amplifier and detector circuits.

Figure 6:
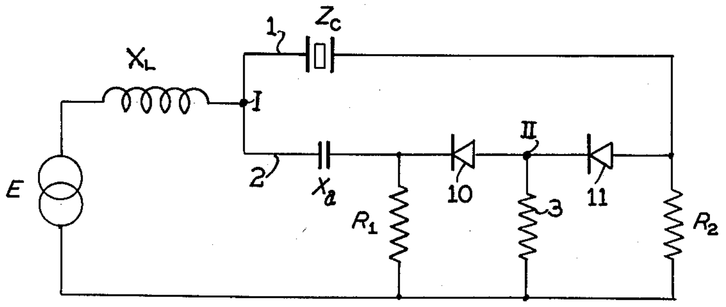
FIG. 6 is a circuit diagram of a simplified circuit embodying a piezoelectric crystal and the principles of the present invention.

In the circuit of FIG. 6 many of the circuit-refinement elements have been stripped away, showing only essentials which, if having the parameters and relative values above discussed, will produce the basic phenomenon of the present invention. In this system, the diodes 10 and 11 are shown connected in series, rather than in the parallel arrangement of FIGS. 3 through 5, further to illustrate the versatility of the present invention as applicable to a wide variety of different types of current-detector circuits.

Figure 8:
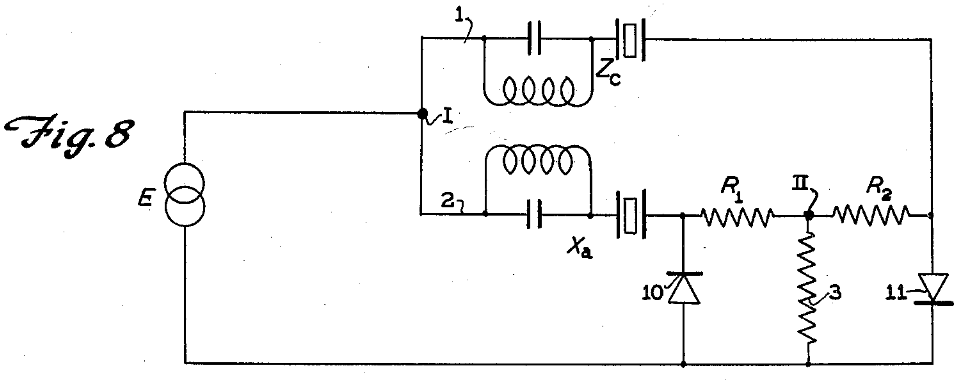
FIGS. 8 and 9 are further views embodying a plurality of piezoelectric means, distributed in each of the parallel arms of the discriminator.
Figure 9:
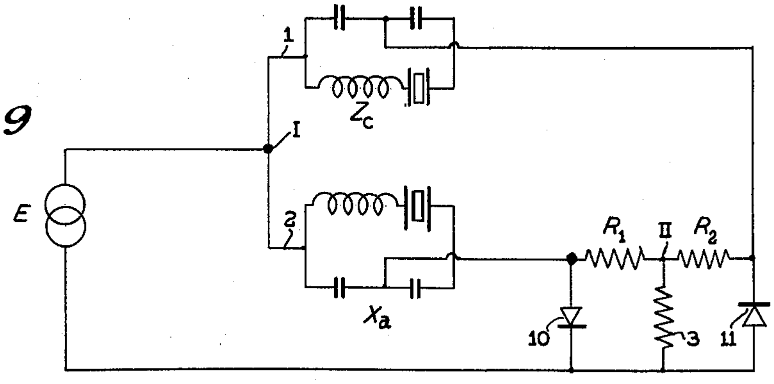

In the further modifications of FIGS. 8 and 9, the impedance elements $X_a$ of the lower parallel arms 2, are also shown embodying piezoelectric crystals and associated impedance-element arrangements similar to those employed in the upper arms 1. These systems constitute plural-crystal high-impedance discriminator networks, again having the relative impedance relationships and values before stated, in order to produce the results of the present invention. In the system of FIG. 8, each network arm comprises a piezoelectric element in series with parallel capacitance and inductance elements, whereas, in the embodiment of FIG. 9, each of the arms embodies the piezoelectric crystal in series with inductance, with such inductance and the crystal shunted by a pair of capacitors, the mid-point of which connects with the upper terminals of the detectors 10 and 11.

Instead of employing resistance elements $R_1$ and $R_2$, inductance elements may also be used, having the advantage of increased output current, with the inductance providing for beat-current detection rather than average-current detection, as in FIGS. 1 through 5.

Further modifications will also occur to those skilled in the art, and all such are considered to fall within the spirit and scope of the present invention, as defined in the appended claims.

What is claimed is:

1. A discriminator circuit for use with a low impedance load and a low impedance source of frequency modulated signals, said circuit comprising:

a pair of arms each having one of its ends connected to a first common point, one arm containing a piezoelectric element having effective shunt and series resonance frequencies on opposite sides of the center frequency of operation, and the other arm having a reactance value adapted to produce a zero crossing of discriminator response intermediate the said shunt and series resonance frequencies;

reactive means to connect said first common point to one side of said source;

resistive means to connect the other ends of said arms to a second common point; and asymmetrically conductive means to couple said arms to the other side of said source, said load being coupled between said second common point and said source.

2. The circuit according to claim 1, wherein said second-mentioned arm is formed with a capacitive element which exhibits substantially the same reactance as said first-named arm at the center frequency of operation.

3. The circuit according to claim 2, wherein said reactive means exhibits an inductive reactance value at the center frequency of operation which is equal to approximately one half the reactance of said capacitive element.

4. The circuit according to claim 3, wherein said reactive means is formed with an inductor and a capacitor connected in parallel relation to one another.

5. The circuit according to claim 4 including a capacitive element connected across said piezoelectric element.

6. The circuit according to claim 5 including the parallel combination of an inductor and a capacitor disposed in series relation to said piezoelectric element in said first-mentioned arm.

References Cited in the file of this patent

UNITED STATES PATENTS

| | | |
|---|---|---|
| 2,712,600 | Beckwith | July 5, 1955 |
| 2,849,607 | Leister | Aug. 26, 1958 |